US009799898B2

United States Patent
Ishida et al.

(10) Patent No.: US 9,799,898 B2
(45) Date of Patent: Oct. 24, 2017

(54) FUEL CELL

(71) Applicant: Honda Motor Co., Ltd., Tokyo (JP)

(72) Inventors: Kentaro Ishida, Tochigi (JP); Shuhei Goto, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 14/386,507

(22) PCT Filed: Jan. 28, 2013

(86) PCT No.: PCT/JP2013/051777
§ 371 (c)(1),
(2) Date: Nov. 18, 2014

(87) PCT Pub. No.: WO2013/140855
PCT Pub. Date: Sep. 26, 2013

(65) Prior Publication Data
US 2015/0072265 A1   Mar. 12, 2015

(30) Foreign Application Priority Data

Mar. 23, 2012   (JP) .................................. 2012-066746

(51) Int. Cl.
*H01M 8/0273* (2016.01)
*H01M 8/2457* (2016.01)
(Continued)

(52) U.S. Cl.
CPC ....... *H01M 8/0273* (2013.01); *H01M 8/0206* (2013.01); *H01M 8/026* (2013.01);
(Continued)

(58) Field of Classification Search
CPC . H01M 8/0273; H01M 8/0206; H01M 8/1004
See application file for complete search history.

(56) References Cited

U.S. PATENT DOCUMENTS

2003/0223325 A1    12/2003   Shimano et al.
2007/0003816 A1*    1/2007   Sugita ................. H01M 8/0247
                                                             429/434
(Continued)

FOREIGN PATENT DOCUMENTS

JP       2007-5222       1/2007
JP       2007-134089     5/2007
(Continued)

*Primary Examiner* — Olatunji Godo
(74) *Attorney, Agent, or Firm* — Nelson Mullins Riley & Scarborough LLP; Anthony A. Laurentano

(57) ABSTRACT

A fuel cell is provided with a power generation unit; the power generation unit is provided with a first metal separator, a first electrolyte membrane/electrode structure, a second metal separator, a second electrolyte membrane/electrode structure, and a third metal separator. The first electrolyte membrane/electrode structure is provided with a first resin frame member at the outer periphery, and the first resin frame member is provided with an inlet buffer section positioned outside a power generation region and coupled to a first oxidant gas flow path, and a protruding section, which is one part of an inlet coupling flow path coupling together the inlet buffer section and an oxidant gas inlet communication hole.

4 Claims, 17 Drawing Sheets

(51) Int. Cl.

| | | |
|---|---|---|
| *H01M 8/2483* | (2016.01) | |
| *H01M 8/026* | (2016.01) | |
| *H01M 8/0267* | (2016.01) | |
| *H01M 8/0271* | (2016.01) | |
| *H01M 8/241* | (2016.01) | |
| *H01M 8/242* | (2016.01) | |
| *H01M 8/0232* | (2016.01) | |
| *H01M 8/1018* | (2016.01) | |
| *H01M 8/0206* | (2016.01) | |
| *H01M 8/0258* | (2016.01) | |
| *H01M 8/0276* | (2016.01) | |
| *H01M 8/0284* | (2016.01) | |

(52) U.S. Cl.
CPC ....... *H01M 8/0232* (2013.01); *H01M 8/0258* (2013.01); *H01M 8/0267* (2013.01); *H01M 8/0271* (2013.01); *H01M 8/0276* (2013.01); *H01M 8/0284* (2013.01); *H01M 8/1018* (2013.01); *H01M 8/241* (2013.01); *H01M 8/242* (2013.01); *H01M 8/2457* (2016.02); *H01M 8/2483* (2016.02); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 2007/0020504 | A1 | 1/2007 | Sugita et al. |
| 2007/0184327 | A1 | 8/2007 | Ishioka et al. |
| 2008/0292941 | A1* | 11/2008 | Oda ............... H01M 8/026 429/434 |
| 2009/0004539 | A1 | 1/2009 | Ishikawa et al. |
| 2009/0291350 | A1* | 11/2009 | Ishida ............ H01M 8/0247 429/499 |
| 2010/0047649 | A1 | 2/2010 | Yamada et al. |
| 2012/0282539 | A1 | 11/2012 | Oda et al. |
| 2012/0321987 | A1 | 12/2012 | Goto et al. |
| 2015/0207164 | A1* | 7/2015 | Ishida ............ H01M 8/1004 429/482 |

FOREIGN PATENT DOCUMENTS

| | | |
|---|---|---|
| JP | 2007-213971 | 8/2007 |
| JP | 2008-41337 | 2/2008 |
| JP | 4151313 | 9/2008 |
| JP | 2009-9838 | 1/2009 |
| JP | 2009-283267 | 12/2009 |
| JP | 4634933 | 2/2011 |
| JP | 2013-20945 | 1/2013 |
| WO | 2011/087013 A1 | 7/2011 |
| WO | 2013/140855 A1 | 9/2013 |

* cited by examiner

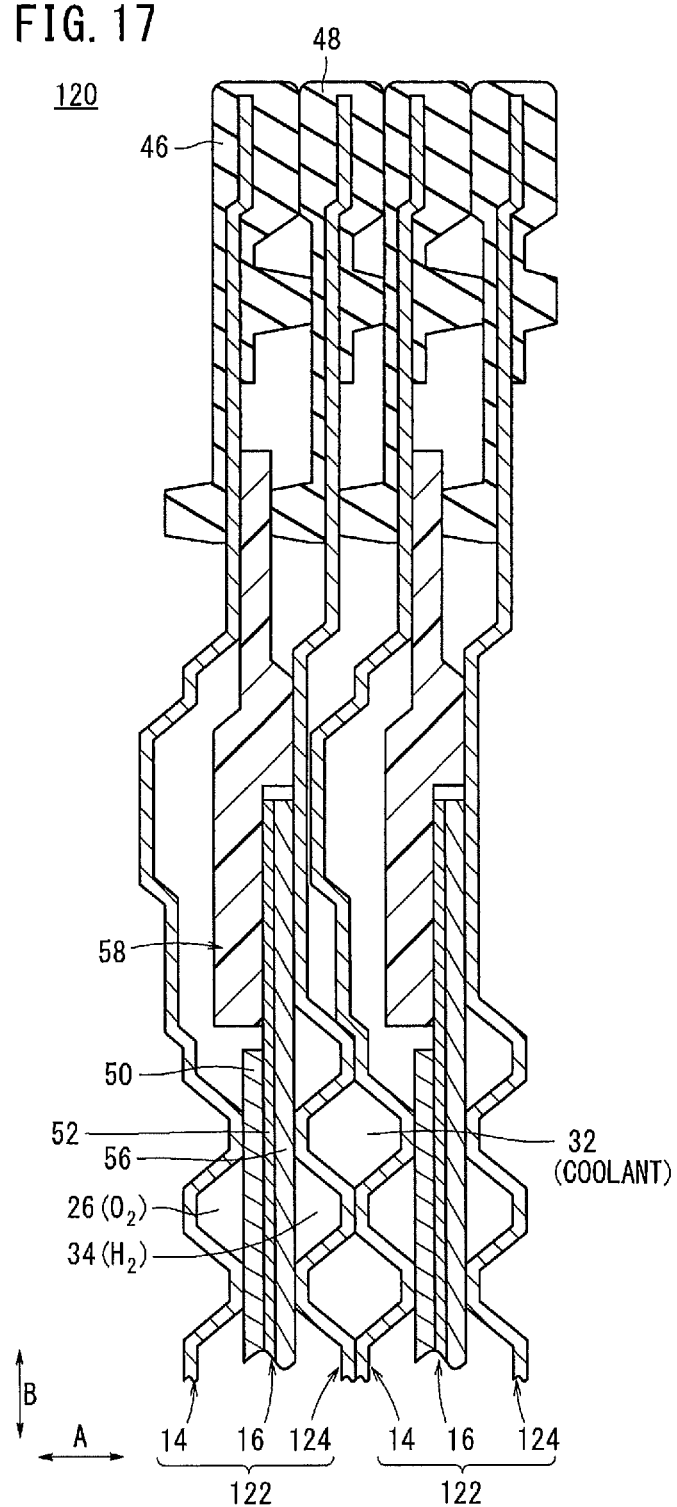

FUEL CELL

RELATED APPLICATIONS

This application is a 35 U.S.C. 371 national stage filing of International Application PCT/JP2013/051777, filed Jan. 28, 2013, which claims priority to Japanese Patent Application No. 2012-066746 filed on Mar. 23, 2012 in Japan. The contents of the aforementioned applications are hereby incorporated by reference.

TECHNICAL FIELD

The present invention relates to a fuel cell formed by stacking a membrane electrode assembly and metal separators in a stacking direction. The membrane electrode assembly includes a pair of electrodes, and an electrolyte interposed between the electrodes. Each of the metal separators has a reactant gas flow field for supplying a reactant gas along an electrode surface and a reactant gas passage for allowing the reactant gas to flow in the stacking direction. A resin frame member is provided at an outer circumferential portion of the membrane electrode assembly.

BACKGROUND ART

For example, a solid polymer electrolyte fuel cell employs a polymer ion exchange membrane as a solid polymer electrolyte membrane, and the solid polymer electrolyte membrane is interposed between an anode and a cathode to form a membrane electrode assembly (MEA). The membrane electrode assembly and a pair of separators sandwiching the membrane electrode assembly make up a power generation cell (unit cell). In the fuel cell of this type, in use, typically, several tens to several hundreds of the power generation cells are stacked together to form a fuel cell stack, for example, mounted in a vehicle.

In many cases, the fuel cell of this type adopts so called internal manifold structure for supplying a fuel gas and an oxygen-containing gas as reactant gases, respectively, to the anode and the cathode of each of the stacked power generation cells.

In the internal manifold, reactant gas supply passages (fuel gas supply passage, oxygen-containing gas supply passage) and reactant gas discharge passages (fuel gas discharge passage, oxygen-containing gas discharge passage) extend through the power generation cells in the stacking direction. Each of the reactant gas supply passages is connected to the inlet of a reactant gas flow field (fuel gas flow field, oxygen-containing gas flow field) for supplying the reactant gas along the electrode surface, and each of the reactant gas discharge passages is connected to the outlet of the reactant gas flow field.

In this case, the reactant gas supply passage and the reactant gas discharge passage are connected to the reactant gas flow field through connection channels including parallel grooves or the like, for allowing the reactant gas to flow smoothly and uniformly. In this regard, in order to prevent entry of seal members into the connection channels, for example, metal plates are provided to cover the connection channels. However, since dedicated metal plates are used, the structure is complicated, and thus the number of production steps is increased uneconomically.

As a technique aimed to address the problem, for example, a fuel cell disclosed in Japanese Patent No. 4634933 is known. In the fuel cell, a membrane electrode assembly and separators are stacked together. The membrane electrode assembly includes a pair of electrodes and an electrolyte interposed between the electrodes. Reactant gas flow fields are formed between the electrolyte electrode assembly and the separators for supplying reactant gases along the electrode surfaces, and reactant gas passages connected to the reactant gas flow fields extend through the fuel cell in the stacking direction.

Further, the separators have connection channels connecting the reactant gas passages and the reactant gas flow fields, and at least one of gas diffusion layers of the electrolyte electrode assembly includes an overlapped portion which is overlapped with the connection channel such that the overlapped portion is tightly attached on the separator to seal the connection channels.

SUMMARY OF INVENTION

In general, the gas diffusion layer of the electrolyte electrode assembly is made of carbon paper or the like. Therefore, if the connection channel is sealed by the gas diffusion layer, since the gas diffusion layer itself tends to be deformed easily, clogging may occur in the connection channel undesirably.

The present invention has been made to solve the problem of this type, and an object of the present invention is to provide a fuel cell having simple and economical structure in which connection channels are sealed suitably without occurrence of any clogging.

According to the present invention, there is provided a fuel cell formed by stacking a membrane electrode assembly and metal separators in a stacking direction. The membrane electrode assembly includes a pair of electrodes, and an electrolyte interposed between the electrodes. Each of the metal separators has a reactant gas flow field for supplying a reactant gas along an electrode surface and a reactant gas passage for allowing the reactant gas to flow in the stacking direction. A resin frame member is provided at an outer circumferential portion of the membrane electrode assembly.

In the fuel cell, the outer shape of the resin frame member is configured such that the resin frame member is positioned inward relative to the reactant gas passage provided at an outer circumference of each of the metal separators. The resin frame member has a buffer positioned outside a power generation area and connected to the reactant gas flow field, and a part of a connection channel connecting the buffer and the reactant gas passage.

In the present invention, the resin frame member is provided at the outer circumferential portion of the membrane electrode assembly, and the resin frame member has the buffer and the part of the connection channel. In the structure, since the resin frame member having relatively high rigidity is used, the resin frame member is not deformed. Thus, with the simple and economical structure, it is possible to reliably prevent occurrence of clogging in the connection channel, while achieving a desired sealing performance.

BRIEF DESCRIPTION OF DRAWINGS

FIG. 17 is a cross sectional view showing the power generation unit.

DESCRIPTION OF EMBODIMENTS

Figure 1:
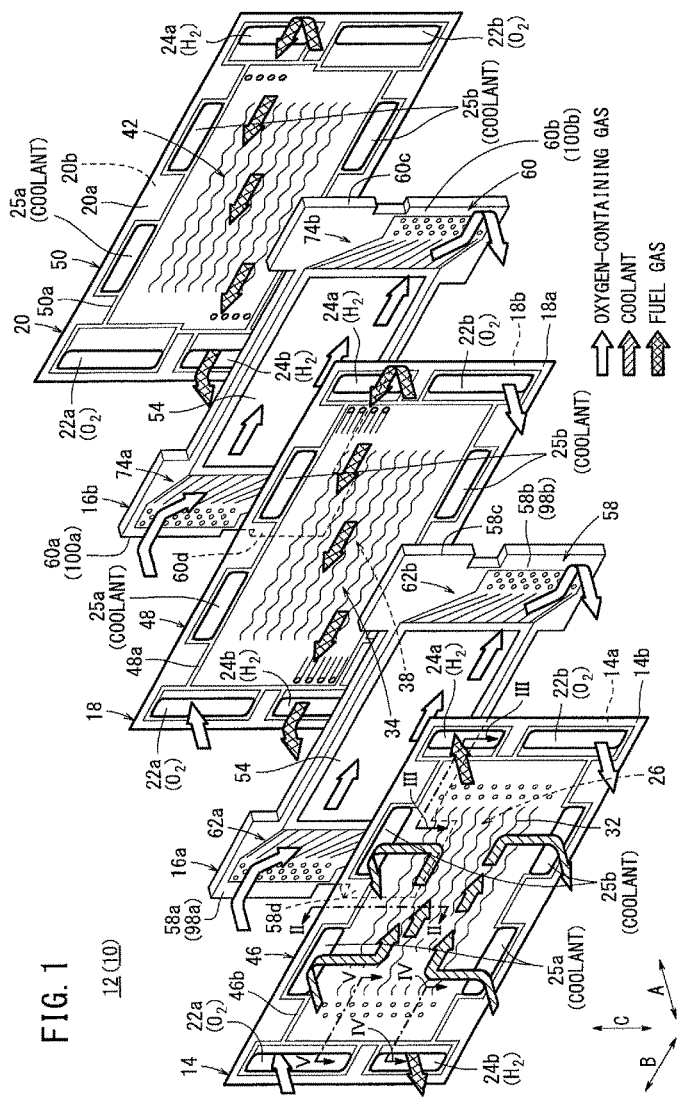
FIG. 1 is an exploded perspective view showing main components of a power generation unit of a fuel cell according to a first embodiment of the present invention.

As shown in FIGS. 1 to 5, a fuel cell 10 according to a first embodiment of the present invention includes a power generation unit 12. A plurality of the power generation units 12 are stacked together in a horizontal direction indicated by an arrow A or in a vertical direction indicated by an arrow C. Each of the power generation units 12 includes a first metal separator 14, a first membrane electrode assembly 16a, a second metal separator 18, a second membrane electrode assembly 16b, and a third metal separator 20.

The first metal separator 14, the second metal separator 18, and the third metal separator 20 are made of, e.g., laterally-elongated metal plates such as steel plates, stainless steel plates, aluminum plates, plated steel sheets, or metal plates having anti-corrosive surfaces by surface treatment. Each of the first metal separator 14, the second metal separator 18, and the third metal separator 20 has a rectangular planar surface, and is formed by corrugating a thin metal plate by press forming to have a corrugated shape (ridges and recesses) in cross section and a wavy or serpentine shape on the surface.

As shown in FIG. 1, at one end of the power generation unit 12 in the long-side direction indicated by the arrow B, specifically, at one end (outer end) of each of the first metal separator 14, the second metal separator 18, and the third metal separator 20 in the long-side direction, an oxygen-containing gas supply passage 22a for supplying an oxygen-containing gas and a fuel gas discharge passage 24b for discharging a fuel gas such as a hydrogen-containing gas are provided. The oxygen-containing gas supply passage 22a and the fuel gas discharge passage 24b extend through the power generation unit 12 in the direction indicated by the arrow A.

At the other end (outer end) of the power generation unit 12 in the long-side direction indicated by the arrow B, a fuel gas supply passage 24a for supplying the fuel gas and an oxygen-containing gas discharge passage 22b for discharging the oxygen-containing gas are provided. The fuel gas supply passage 24a and the oxygen-containing gas discharge passage 22b extend through the power generation unit 12 in the direction indicated by the arrow A.

At both ends of the power generation unit 12 in a short-side direction indicated by an arrow C, a pair of coolant supply passages 25a for supplying a coolant are provided on one side adjacent to the oxygen-containing gas supply passage 22a. The coolant supply passages 25a extend through the power generation unit 12 in the direction indicated by the arrow A. At both ends of the power generation unit 12 in the short-side direction, a pair of coolant discharge passages 25b for discharging the coolant are provided on the other side adjacent to the fuel gas supply passage 24a.

Figure 6:
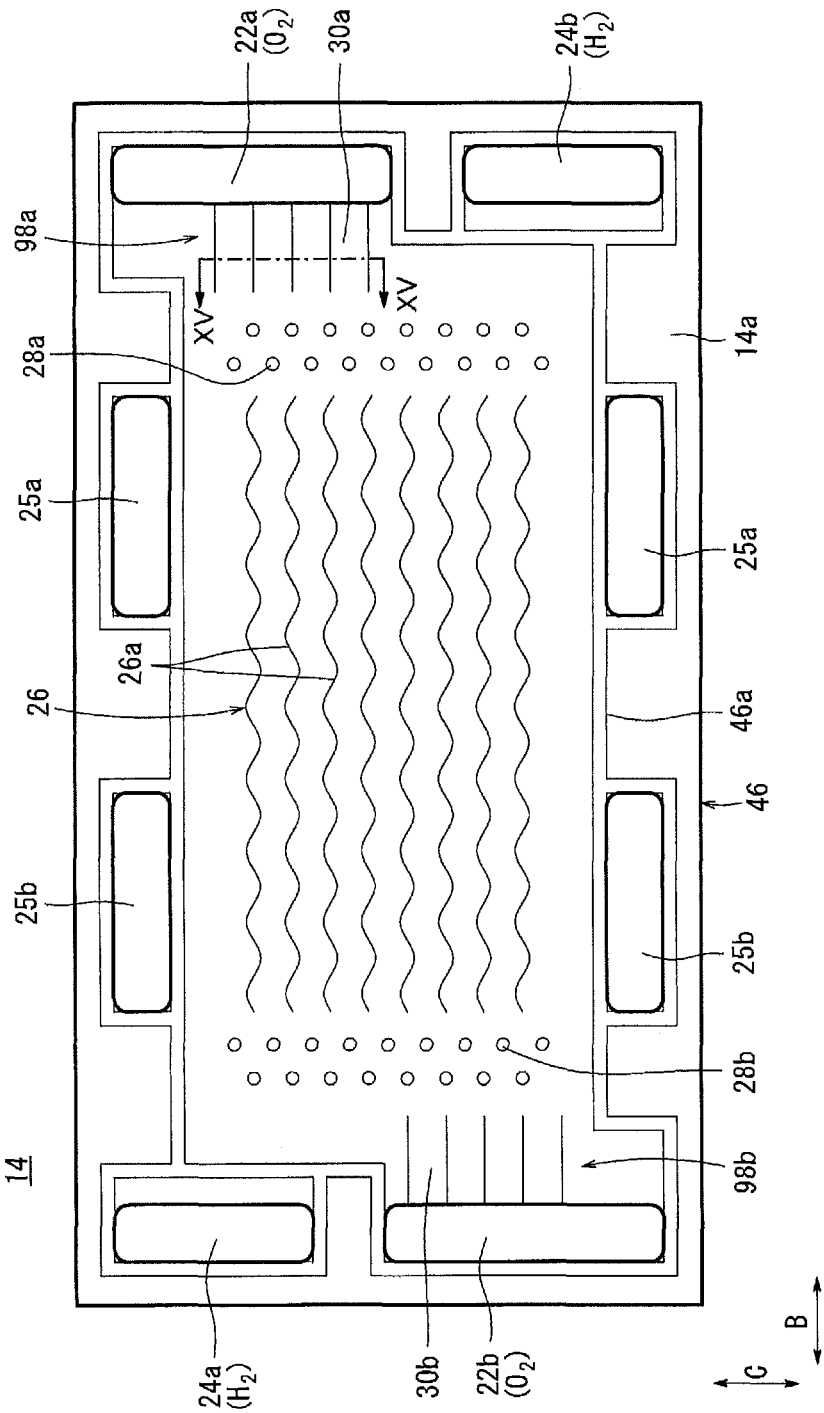
FIG. 6 is a front view showing a first metal separator of the power generation unit.

As shown in FIG. 6, the first metal separator 14 has a first oxygen-containing gas flow field 26 on its surface 14a facing the first membrane electrode assembly 16a. The first oxygen-containing gas flow field 26 is connected to the oxygen-containing gas supply passage 22a and the oxygen-containing gas discharge passage 22b.

The first oxygen-containing gas flow field 26 includes a plurality of wavy flow grooves (or straight flow grooves) 26a extending in the direction indicated by the arrow B. A plurality of inlet bosses 28a are provided adjacent to the inlet of the first oxygen-containing gas flow field 26, and a plurality of outlet bosses 28b are provided adjacent to the outlet of the first oxygen-containing gas flow field 26.

A plurality of inlet connection grooves 30a, which are formed as part of a bridge section, are formed between the inlet bosses 28a and the oxygen-containing gas supply passage 22a, and a plurality of outlet connection grooves 30b, which are formed as part of a bridge section, are formed between the outlet bosses 28b and the oxygen-containing gas discharge passage 22b.

As shown in FIG. 1, a coolant flow field 32 is formed on a surface 14b of the first metal separator 14. The coolant flow field 32 is connected to the pair of coolant supply passages 25a and the pair of coolant discharge passages 25b. The coolant flow field 32 is formed by stacking the back surface of the first oxygen-containing gas flow field 26 and the back surface of a second fuel gas flow field 42 to be described later.

Figure 7:
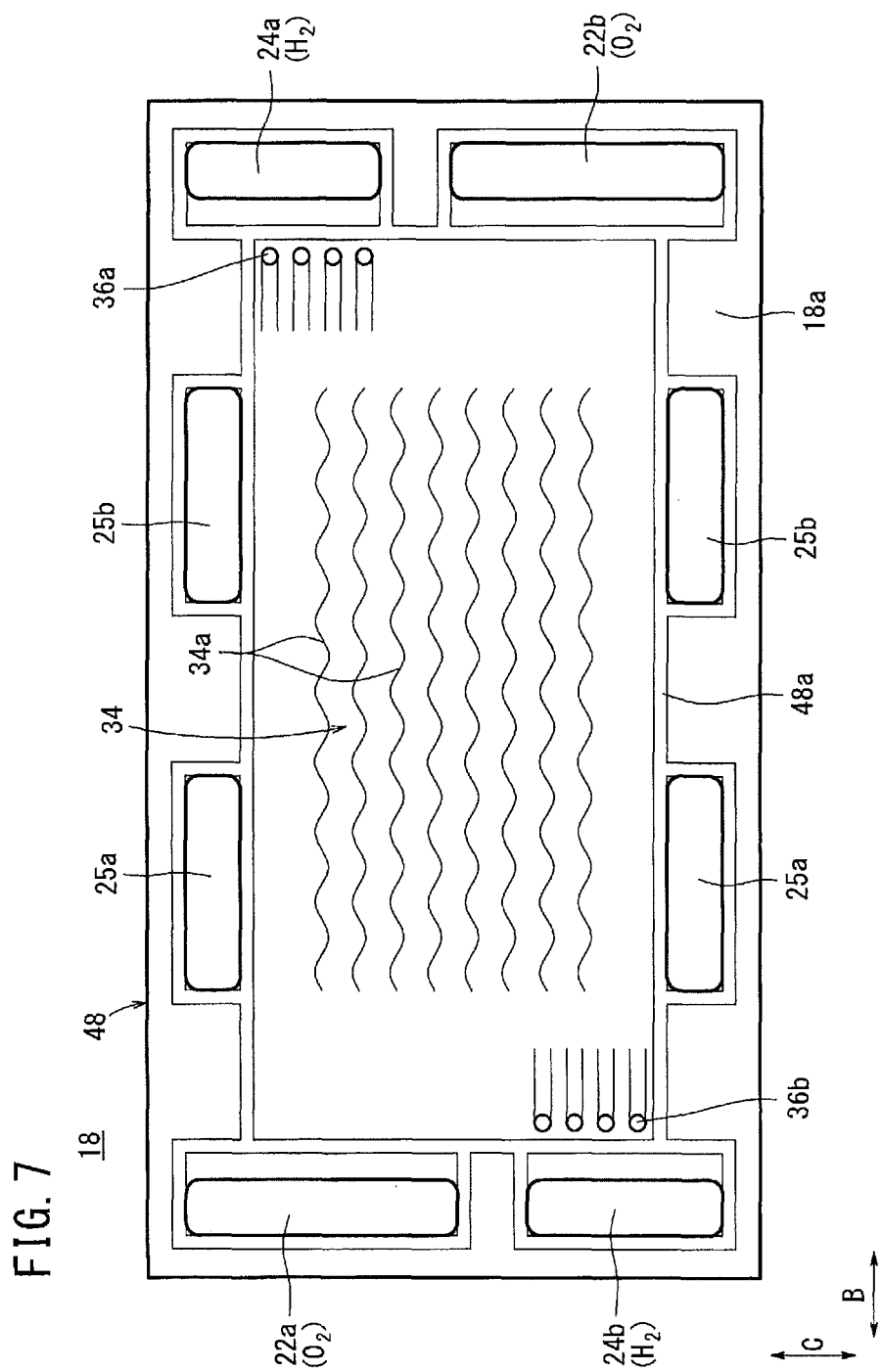
FIG. 7 is a view showing one surface of a second metal separator of the power generation unit.

As shown in FIG. 7, the second metal separator 18 has a first fuel gas flow field 34 on its surface 18a facing the first membrane electrode assembly 16a. The first fuel gas flow field 34 is connected to the fuel gas supply passage 24a and the fuel gas discharge passage 24b. The first fuel gas flow field 34 includes a plurality of wavy flow grooves (or straight flow grooves) 34a extending in the direction indicated by the arrow B. A plurality of supply holes 36a are formed adjacent to the fuel gas supply passage 24a, and a plurality of discharge holes 36b are formed adjacent to the fuel gas discharge passage 24b.

Figure 8:
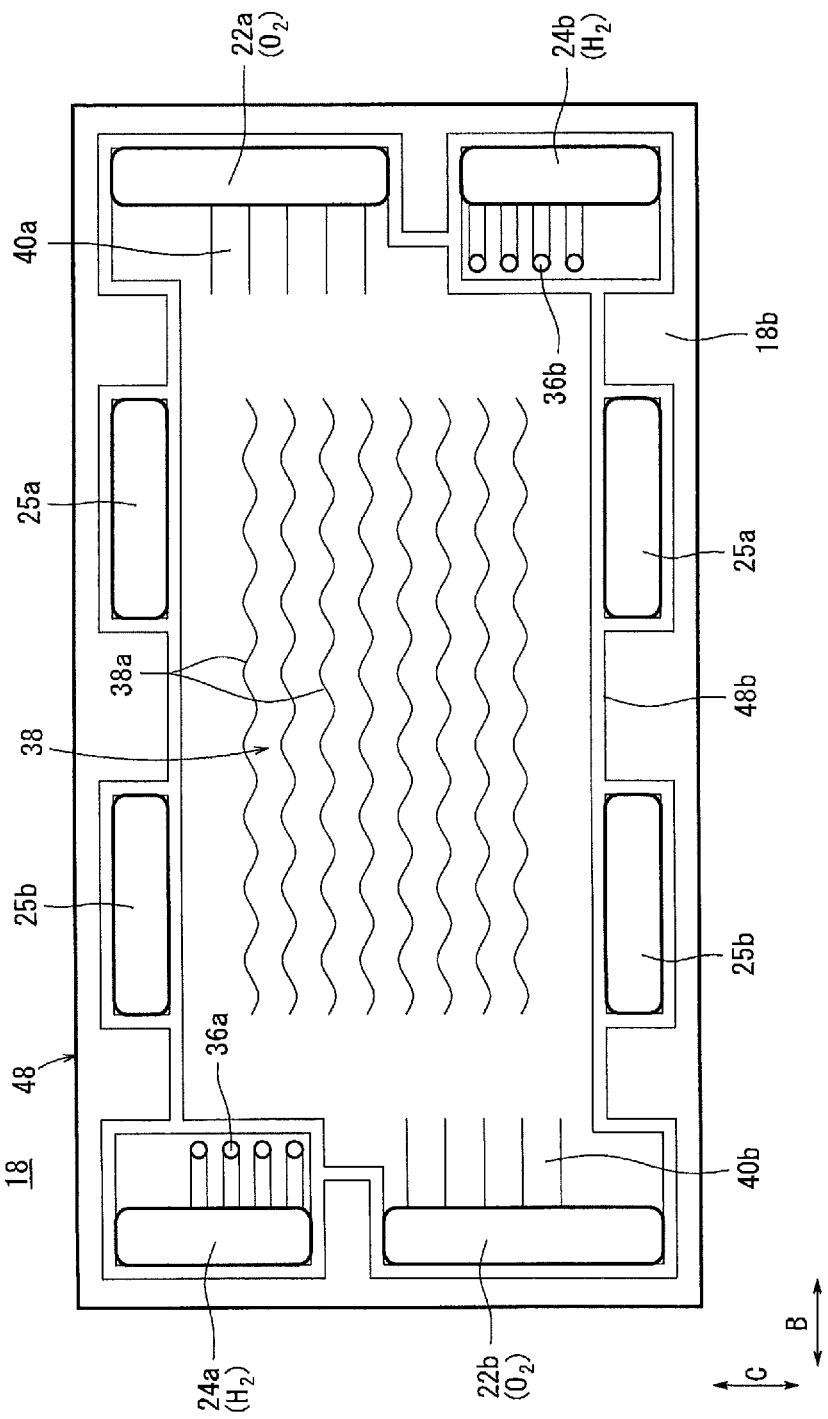
FIG. 8 is a view showing the other surface of the second metal separator.

As shown in FIG. 8, the second metal separator 18 has a second oxygen-containing gas flow field 38 on its surface 18b facing the second membrane electrode assembly 16b. The second oxygen-containing gas flow field 38 is connected to the oxygen-containing gas supply passage 22a and the oxygen-containing gas discharge passage 22b. The second oxygen-containing gas flow field 38 includes wavy flow grooves (or straight flow grooves) 38a extending in the direction indicated by the arrow B. A plurality of inlet connection grooves 40a are formed adjacent to the oxygen-containing gas supply passage 22a, and a plurality of outlet connection grooves 40b are formed adjacent to the oxygen-containing gas discharge passage 22b.

Figure 9:
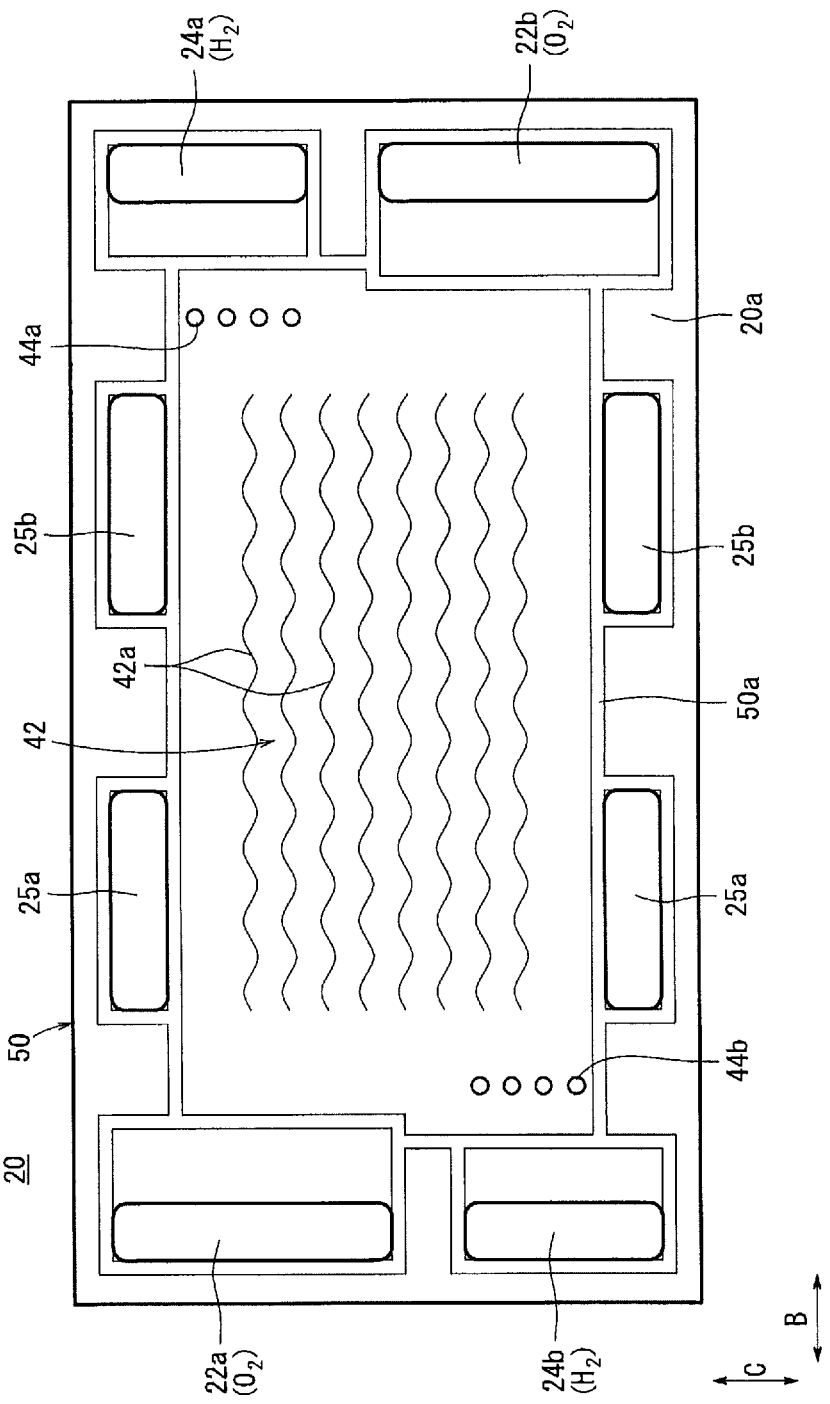
FIG. 9 is a view showing one surface of a third metal separator of the power generation unit.

As shown in FIG. 9, the third metal separator 20 has the second fuel gas flow field 42 on its surface 20a facing the second membrane electrode assembly 16b. The second fuel gas flow field 42 is connected to the fuel gas supply passage 24a and the fuel gas discharge passage 24b. The second fuel gas flow field 42 includes a plurality of wavy flow grooves (or straight flow grooves) 42a extending in the direction indicated by the arrow B.

Figure 3:
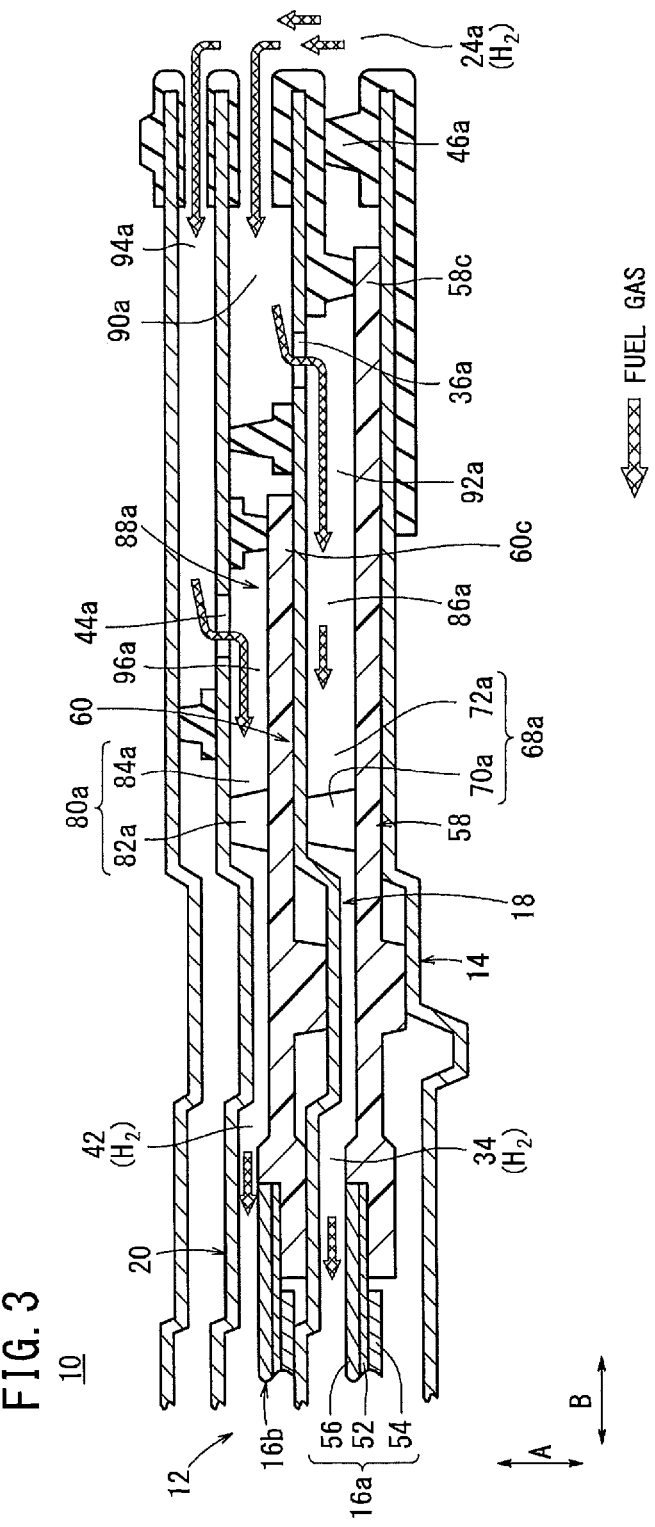
FIG. 3 is a cross sectional view showing the power generation unit taken along a line III-III in FIG. 1.
Figure 4:
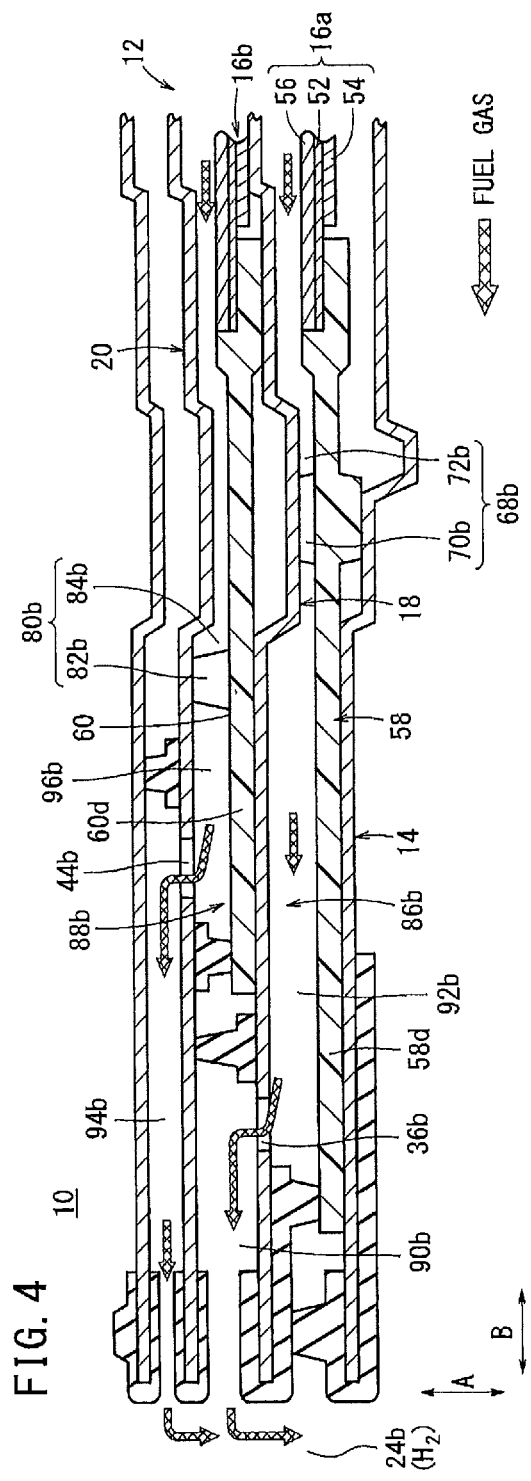
FIG. 4 is a cross sectional view showing the power generation unit taken along a line IV-IV in FIG. 1.

A plurality of supply holes 44a are formed adjacent to the fuel gas supply passage 24a, and a plurality of discharge holes 44b are formed adjacent to the fuel gas discharge passage 24b. As shown in FIG. 3, the supply holes 44a are positioned inward relative to the supply holes 36a of the second metal separator 18 (closer to the fuel gas flow field), and as shown in FIG. 4, the discharge holes 44b are positioned inward relative to the discharge holes 36b of the second metal separator 18 (closer to the fuel gas flow field).

Figure 10:
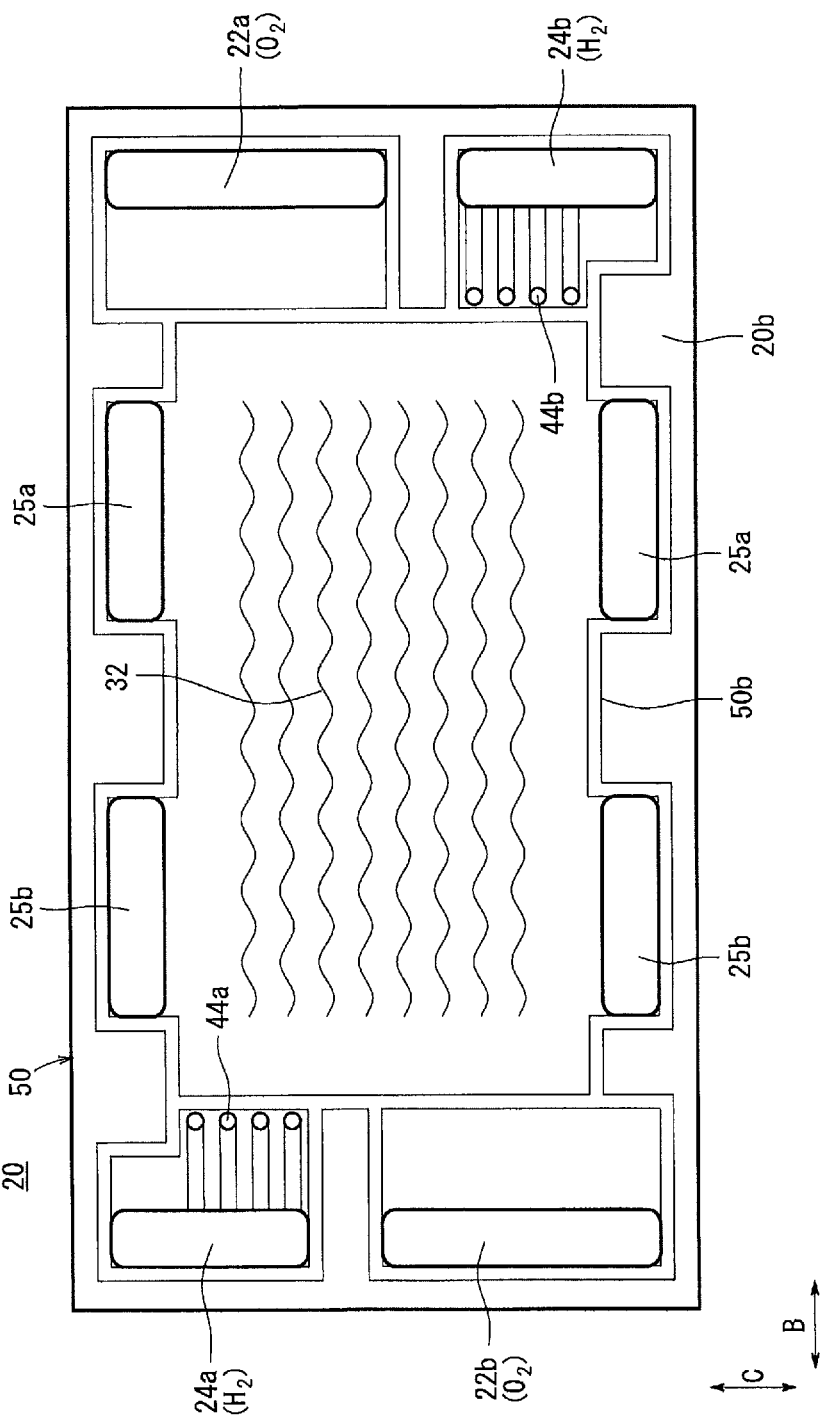
FIG. 10 is a view showing the other surface of the third metal separator.

As shown in FIG. 10, part of the coolant flow field 32, which is the back surface of the second fuel gas flow field 42, is formed on a surface 20b of the third metal separator 20. The surface 20b of the third metal separator 20 is stacked on the surface 14b of the first metal separator 14 adjacent to the third metal separator 20 to thereby form the coolant flow field 32 between the third metal separator 20 and the first metal separator 14.

As shown in FIG. 1, a first seal member 46 is formed integrally with the surfaces 14a, 14b of the first metal separator 14, around the outer circumferential end of the first metal separator 14. A second seal member 48 is formed integrally with the surfaces 18a, 18b of the second metal separator 18, around the outer circumferential end of the second metal separator 18. A third seal member 50 is formed integrally with the surfaces 20a, 20b of the third metal separator 20, around the outer circumferential end of the third metal separator 20.

Each of the first seal member 46, the second seal member 48, and the third seal member 50 is made of seal material, cushion material, or packing material such as an EPDM, an NBR, a fluoro rubber, a silicone rubber, a fluorosilicone rubber, a butyl rubber, a natural rubber, a styrene rubber, a chloroprene rubber, or an acrylic rubber.

As shown in FIG. 6, the first seal member 46 includes a first ridge seal 46a on the surface 14a of the first metal separator 14. The first ridge seal 46a surrounds the oxygen-containing gas supply passage 22a, the oxygen-containing gas discharge passage 22b, and the first oxygen-containing gas flow field 26, while allowing the oxygen-containing gas supply passage 22a and the oxygen-containing gas discharge passage 22b to be connected to the first oxygen-containing gas flow field 26 at outer ends thereof. As shown in FIG. 1, the first seal member 46 further includes a second ridge seal 46b on the surface 14b of the first metal separator 14. The second ridge seal 46b surrounds the coolant supply passages 25a, the coolant discharge passages 25b, and the coolant flow field 32, while allowing the coolant supply passages 25a and the coolant discharge passages 25b to be connected to the coolant flow field 32 at outer ends thereof.

As shown in FIG. 7, the second seal member 48 includes a first ridge seal 48a on the surface 18a of the second metal separator 18. The first ridge seal 48a surrounds the supply holes 36a, the discharge holes 36b, and the first fuel gas flow field 34, while allowing the supply holes 36a and the discharge holes 36b to be connected to the first fuel gas flow field 34.

As shown in FIG. 8, the second seal member 48 further includes a second ridge seal 48b on the surface 18b of the second metal separator 18. The second ridge seal 48b surrounds the oxygen-containing gas supply passage 22a, the oxygen-containing gas discharge passage 22b, and the second oxygen-containing gas flow field 38, while allowing the oxygen-containing gas supply passage 22a and the oxygen-containing gas discharge passage 22b to be connected to the second oxygen-containing gas flow field 38 at outer ends thereof.

As shown in FIG. 9, the third seal member 50 includes a first ridge seal 50a on the surface 20a of the third metal separator 20. The first ridge seal 50a surrounds the supply holes 44a, the discharge holes 44b, and the second fuel gas flow field 42, while allowing the supply holes 44a and the discharge holes 44b to be connected to the second fuel gas flow field 42.

As shown in FIG. 10, the third seal member 50 further includes a second ridge seal 50b on the surface 20b of the third metal separator 20. The second ridge seal 50b surrounds the coolant supply passages 25a, the coolant discharge passages 25b, and the coolant flow field 32, while allowing the coolant supply passages 25a and the coolant discharge passages 25b to be connected to the coolant flow field 32 at outer ends thereof.

Figure 2:
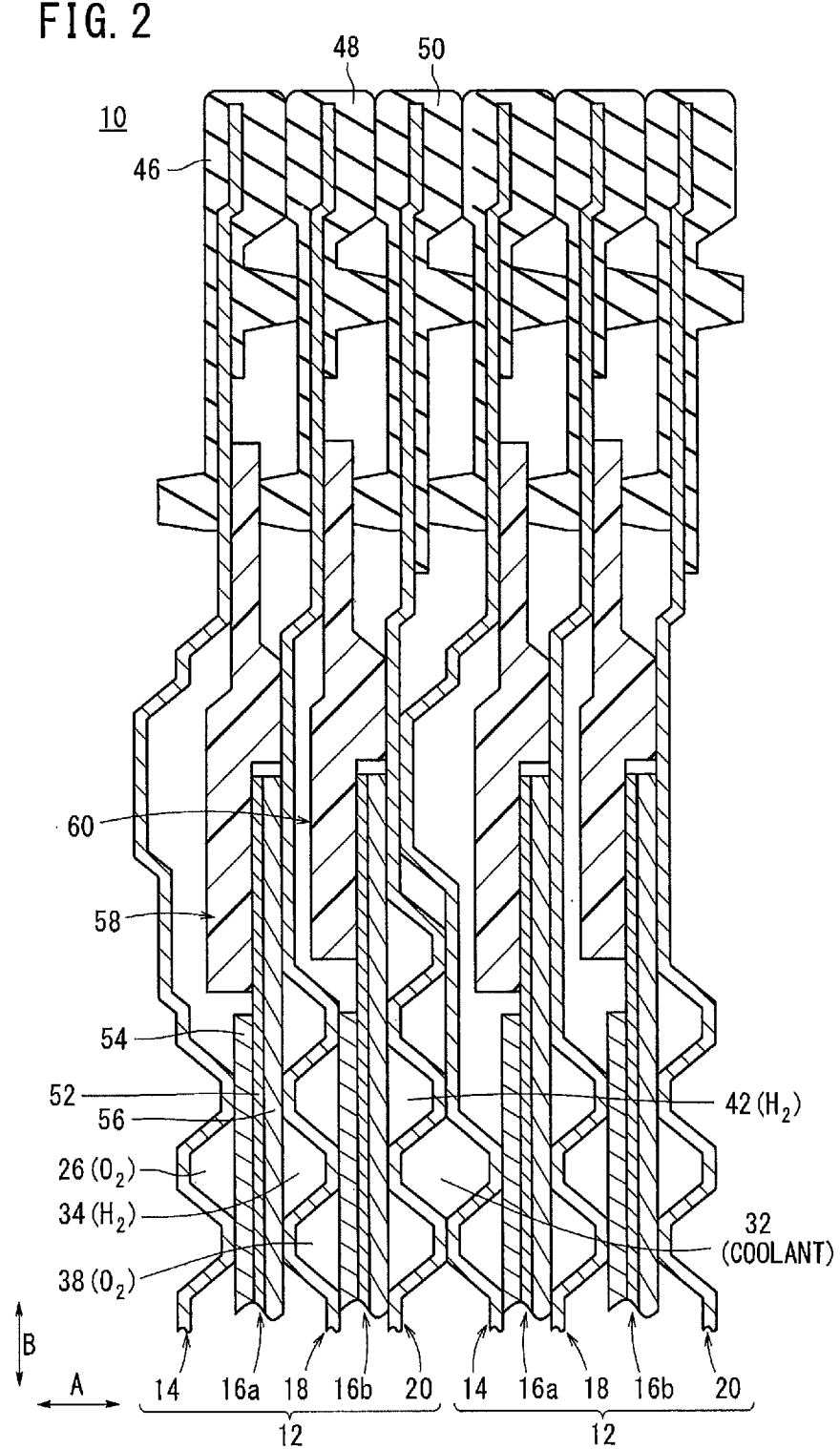
FIG. 2 is a cross sectional view showing the power generation unit taken along a line II-II in FIG. 1.

As shown in FIG. 2, each of the first membrane electrode assembly 16a and the second membrane electrode assembly 16b includes a solid polymer electrolyte membrane 52, and a cathode 54 and an anode 56 sandwiching the solid polymer electrolyte membrane 52. The solid polymer electrolyte membrane 52 is formed by impregnating a thin membrane of perfluorosulfonic acid with water, for example. The surface area of the cathode 54 is smaller than the surface areas of the anode 56 and the solid polymer electrolyte membrane 52 to form a stepped-type MEA having different sizes of components. It should be noted that the cathode 54, the anode 56, and the solid polymer electrolyte membrane 52 may have the same surface area. Further, the surface area of the anode 56 may be smaller than the surface areas of the cathode 54 and the solid polymer electrolyte membrane 52.

Each of the cathode 54 and the anode 56 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 54 and the electrode catalyst layer of the anode 56 are formed on both surfaces of the solid polymer electrolyte membrane 52, respectively.

In the first membrane electrode assembly 16a, a first resin frame member 58 is formed integrally with the outer circumferential edge portion of the solid polymer electrolyte membrane 52, outside the terminal end portion of the cathode 54, e.g., by injection molding. In the second membrane electrode assembly 16b, a second resin frame member 60 is formed integrally with the outer circumferential edge portion of the solid polymer electrolyte membrane 52, outside the terminal end portion of the cathode 54, e.g., injection molding.

The outer shapes of the first resin frame member 58 and the second resin frame member 60 are configured such that the first resin frame member 58 and the second resin frame member 60 are positioned inward relative to the oxygen-containing gas supply passage 22a, the oxygen-containing gas discharge passage 22b, the fuel gas supply passage 24a, the fuel gas discharge passage 24b, the coolant supply passages 25a, and the coolant discharge passages 25b (inwardly in the direction indicated by the arrow B and in the direction indicated by the arrow C).

As the resin material of the first resin frame member 58 and the second resin frame member 60, for example, in addition to general purpose plastic, for example, engineering plastic, super engineering plastic or the like is adopted.

Figure 11:
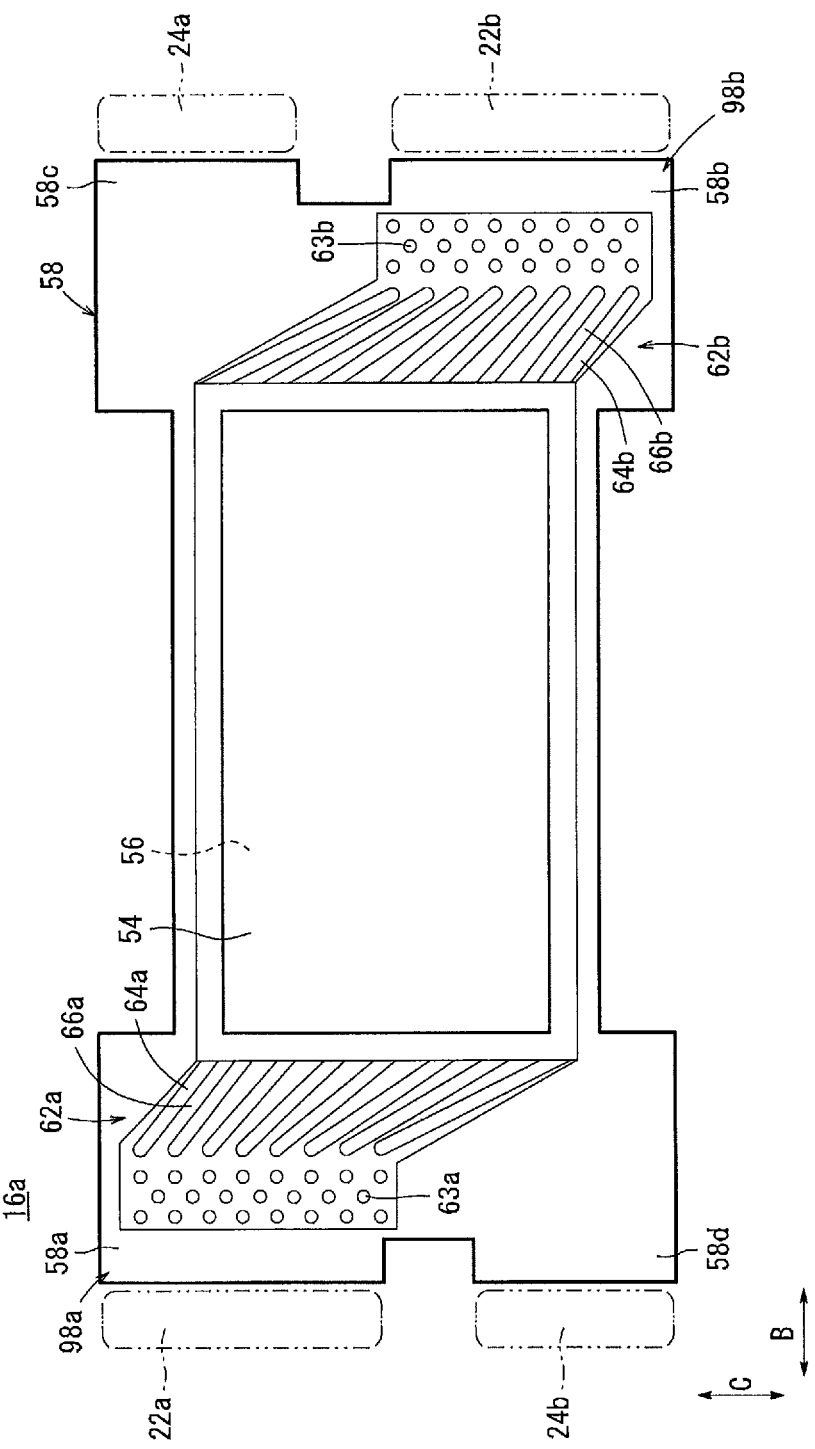
FIG. 11 is a view showing one surface of a first membrane electrode assembly of the power generation unit.
Figure 12:
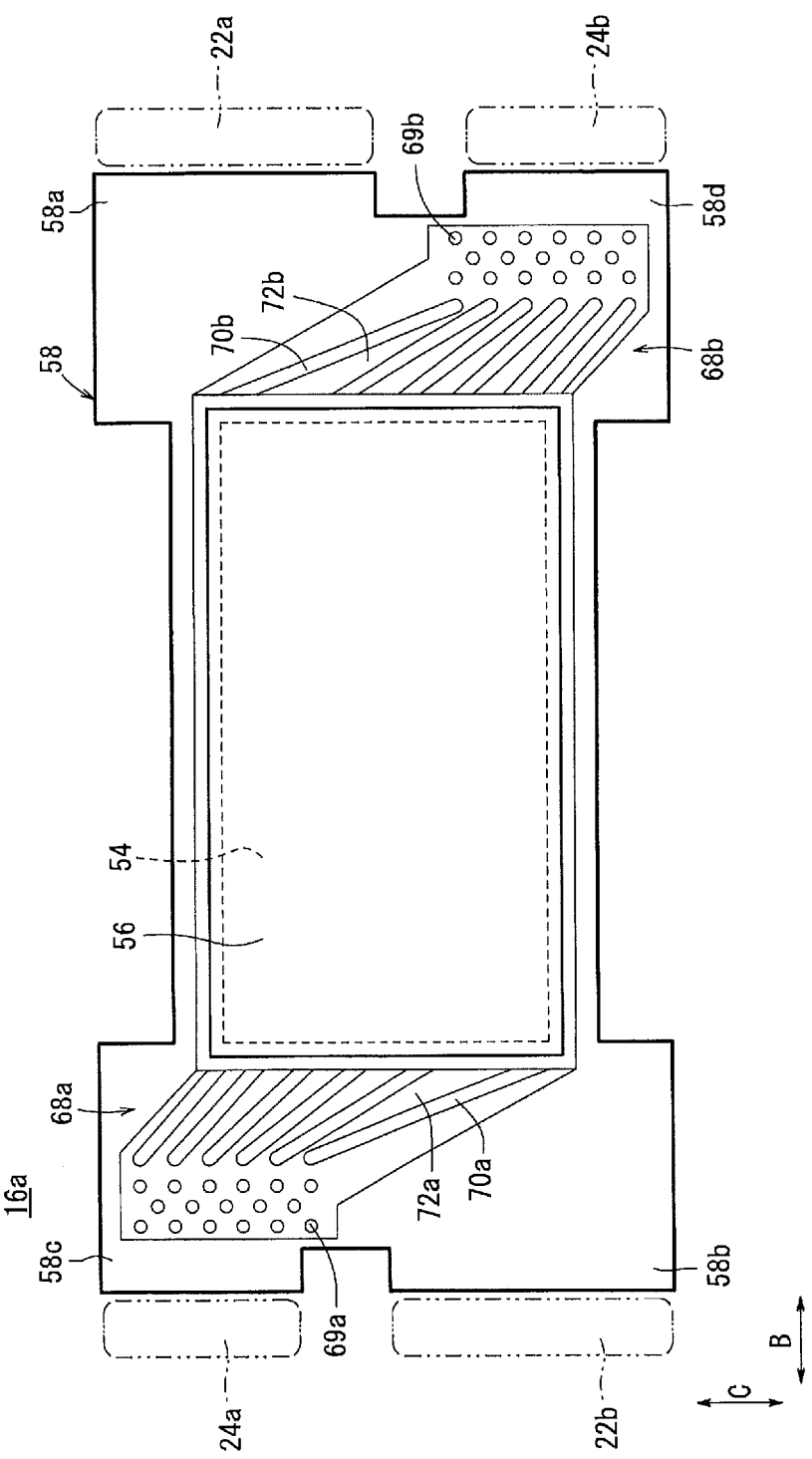
FIG. 12 is a view showing the other surface of the first membrane electrode assembly.

As shown in FIGS. 11 and 12, the first resin frame member 58 includes extensions 58a, 58b protruding respectively toward the oxygen-containing gas supply passage 22a and the oxygen-containing gas discharge passage 22b, at both ends thereof in the longitudinal direction indicated by the arrow B, and further includes extensions 58c, 58d protruding respectively toward the fuel gas supply passage 24a and the fuel gas discharge passage 24b, at the both ends.

As shown in FIG. 11, on a surface of the first resin frame member 58 on a side where the cathode 54 is provided, an inlet buffer 62a is provided between the oxygen-containing gas supply passage 22a and the inlet of the first oxygen-containing gas flow field 26, and an outlet buffer 62b is provided between the oxygen-containing gas discharge passage 22b and the outlet of the first oxygen-containing gas flow field 26.

The inlet buffer 62a includes a plurality of linear ridges 64a formed integrally with the first resin frame member 58, and inlet guide grooves 66a are formed between the ridges 64a. The outlet buffer 62b includes a plurality of linear ridges 64b formed integrally with the first resin frame member 58, and outlet guide grooves 66b are formed between the ridges 64b. A plurality of bosses 63a, 63b are formed in the inlet buffer 62a and the outlet buffer 62b, respectively. The inlet buffer 62a and the outlet buffer 62b may include only the linear ridges or only the bosses.

As shown in FIG. 12, on a surface of the first resin frame member 58 on a side where the anode 56 is provided, an inlet buffer 68a is provided between the fuel gas supply passage 24a and the first fuel gas flow field 34, and an outlet buffer 68b is provided between the fuel gas discharge passage 24b and the first fuel gas flow field 34.

The inlet buffer 68a includes a plurality of linear ridges 70a, and inlet guide grooves 72a are formed between the ridges 70a. The outlet buffer 68b includes a plurality of linear ridges 70b, and outlet guide grooves 72b are formed between the ridges 70b. A plurality of bosses 69a, 69b are formed in the inlet buffer 68a and the outlet buffer 68b, respectively. The inlet buffer 68a and the outlet buffer 68b may include only the linear ridges or only the bosses.

Figure 13:
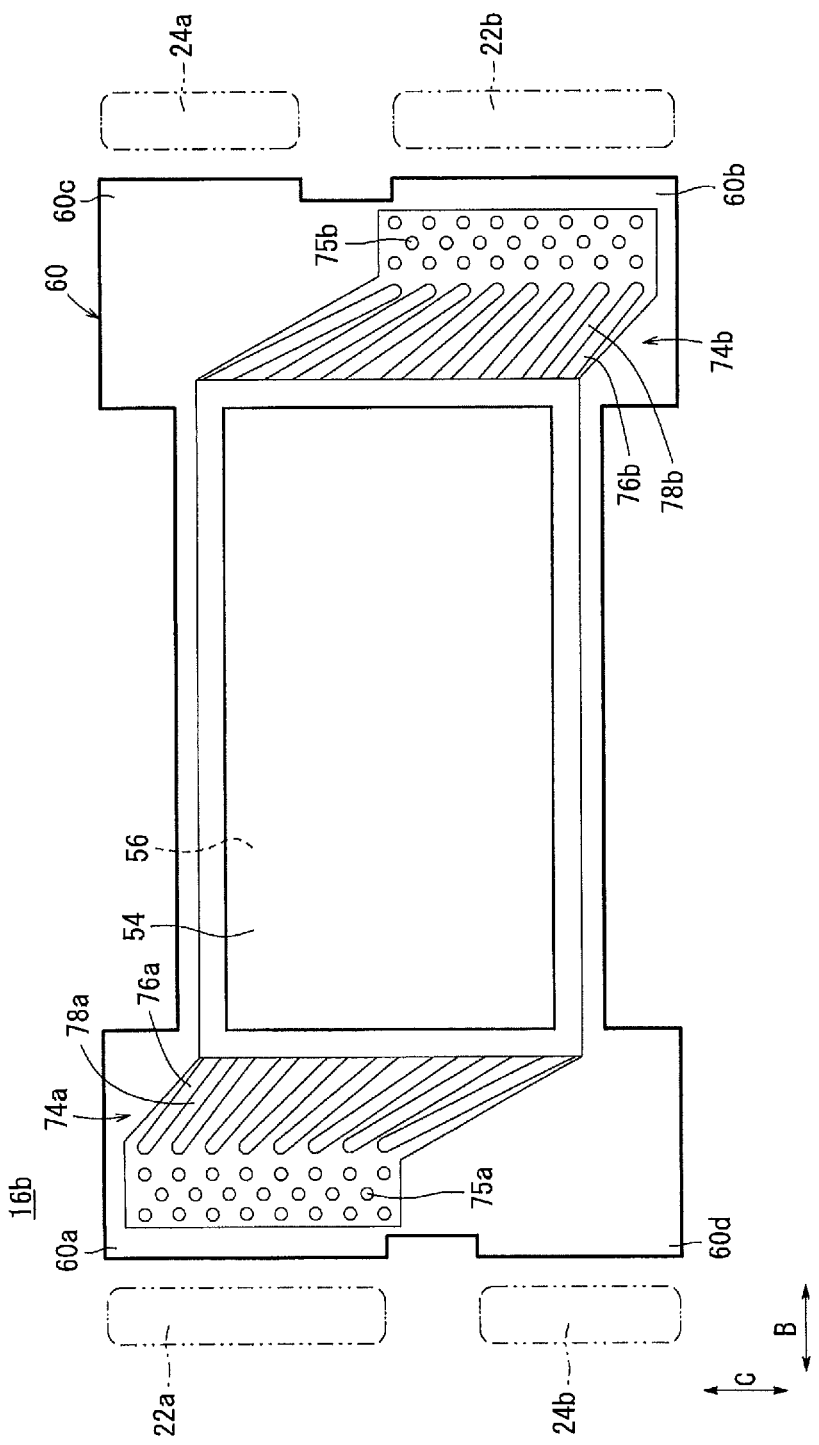
FIG. 13 is a view showing one surface of a second membrane electrode assembly of the power generation unit.
Figure 14:
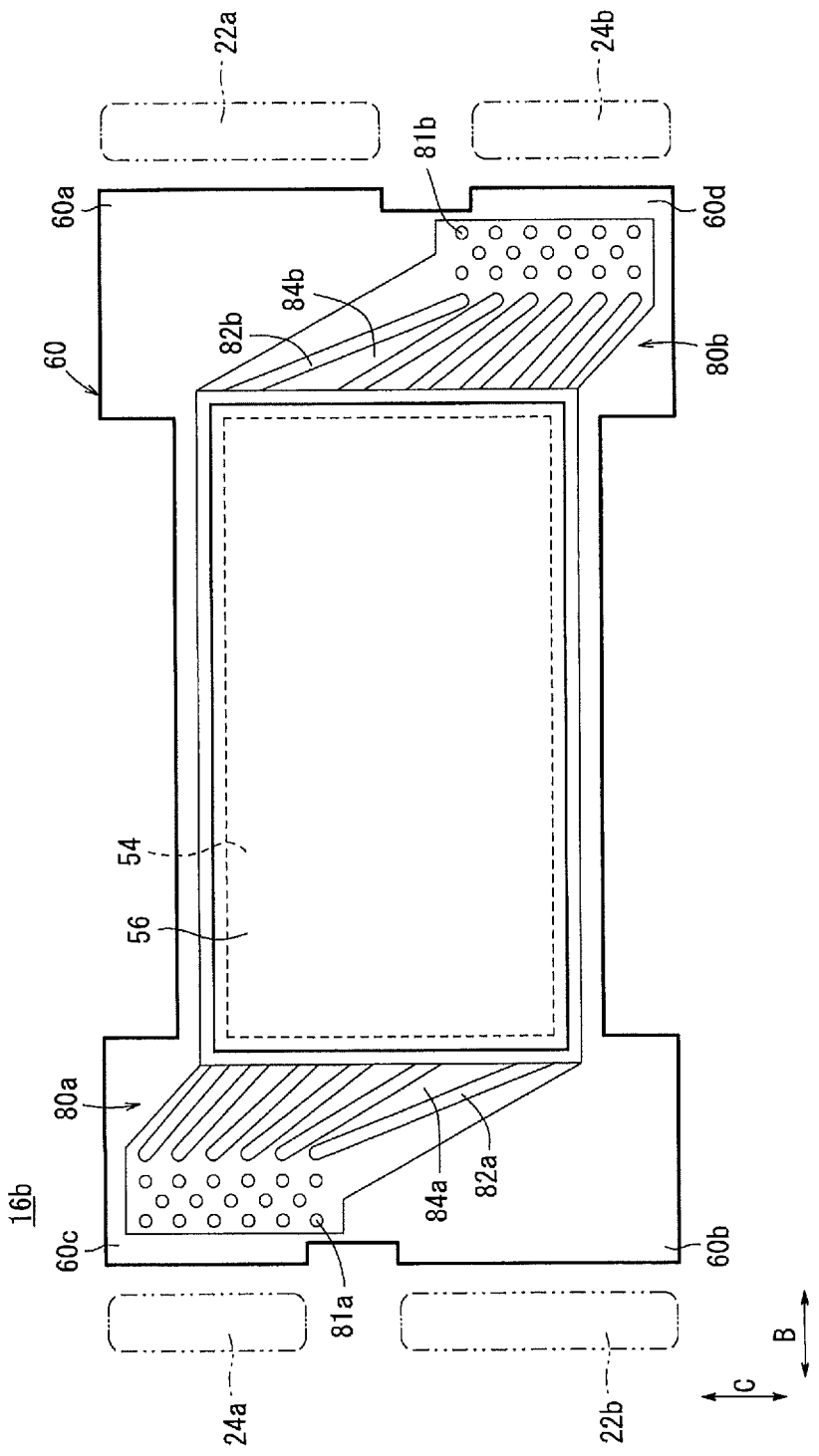
FIG. 14 is a view showing the other surface of the second membrane electrode assembly.

As shown in FIGS. 13 and 14, the second resin frame member 60 of the second membrane electrode assembly 16b includes extensions 60a, 60b, 60c, and 60d, protruding toward the oxygen-containing gas supply passage 22a, the oxygen-containing gas discharge passage 22b, the fuel gas supply passage 24a, and the fuel gas discharge passage 24b, respectively.

As shown in FIG. 13, on a surface of the second resin frame member 60 on a side where the cathode 54 is provided, an inlet buffer 74a is provided between the oxygen-containing gas supply passage 22a and the second oxygen-containing gas flow field 38, and an outlet buffer 74b is provided between the oxygen-containing gas discharge passage 22b and the second oxygen-containing gas flow field 38.

The inlet buffer 74a includes a plurality of linear ridges 76a, and inlet guide grooves 78a are formed between the ridges 76a. The outlet buffer 74b includes a plurality of linear ridges 76b, and outlet guide grooves 78b are formed between the ridges 76b. A plurality of bosses 75a, 75b are formed in the inlet buffer 74a and the outlet buffer 74b, respectively.

As shown in FIG. 14, on a surface of the second resin frame member 60 on a side where the anode 56 is provided, an inlet buffer 80a is provided between the fuel gas supply passage 24a and the second fuel gas flow field 42, and an outlet buffer 80b is provided between the fuel gas discharge passage 24b and the second fuel gas flow field 42.

The inlet buffer 80a includes a plurality of linear ridges 82a, and inlet guide grooves 84a are formed between the ridges 82a. The outlet buffer 80b includes a plurality of linear ridges 82b, and outlet guide grooves 84b are formed between the ridges 82b. A plurality of bosses 81a, 81b are formed in the inlet buffer 80a and the outlet buffer 80b, respectively.

As shown in FIG. 3, the fuel gas supply passage 24a and the first fuel gas flow field 34 are connected through an inlet connection channel 86a and the inlet buffer 68a, and the fuel gas supply passage 24a and the second fuel gas flow field 42 are connected through an inlet connection channel 88a and the inlet buffer 80a.

The inlet connection channel 86a is formed between the fuel gas supply passage 24a and the inlet buffer 68a. The inlet connection channel 86a includes a first channel 90a formed between the second metal separator 18 and the third metal separator 20 that are adjacent to each other, the supply holes 36a formed in the second metal separator 18, and a second channel 92a formed between the second metal separator 18 and the extension 58c of the first resin frame member 58. One end of the first channel 90a is connected to the fuel gas supply passage 24a, and the other end of the first channel 90a is connected to the supply holes 36a. One end of the second channel 92a is connected to the supply holes 36a, and the other end of the second channel 92a is connected to the inlet buffer 68a.

Likewise, the inlet connection channel 88a includes a first channel 94a formed between the third metal separator 20 and the first metal separator 14 that are adjacent to each other, the supply holes 44a formed in the third metal separator 20, and a second channel 96a formed between the third metal separator 20 and the extension 60c of the second resin frame member 60. One end of the first channel 94a is connected to the fuel gas supply passage 24a, and the other end of the first channel 94a is connected to the supply holes 44a. One end of the second channel 96a is connected to the supply holes 44a, and the other end of the second channel 96a is connected to the inlet buffer 80a.

As shown in FIG. 4, the fuel gas discharge passage 24b and the outlet buffer 68b are connected through an outlet connection channel 86b, and the fuel gas discharge passage 24b and the outlet buffer 80b are connected through an outlet connection channel 88b. The outlet connection channel 86b includes a first channel 90b formed between the second metal separator 18 and the third metal separator 20, the discharge holes 36b formed in the second metal separator 18, and a second channel 92b formed between the second metal separator 18 and the extension 58d of the first resin frame member 58.

The outlet connection channel 88b includes a first channel 94b formed between the third metal separator 20 and the adjacent first metal separator 14, the discharge holes 44b formed in the third metal separator 20, and a second channel 96b formed between the third metal separator 20 and the extension 60d of the second resin frame member 60.

Figure 5:
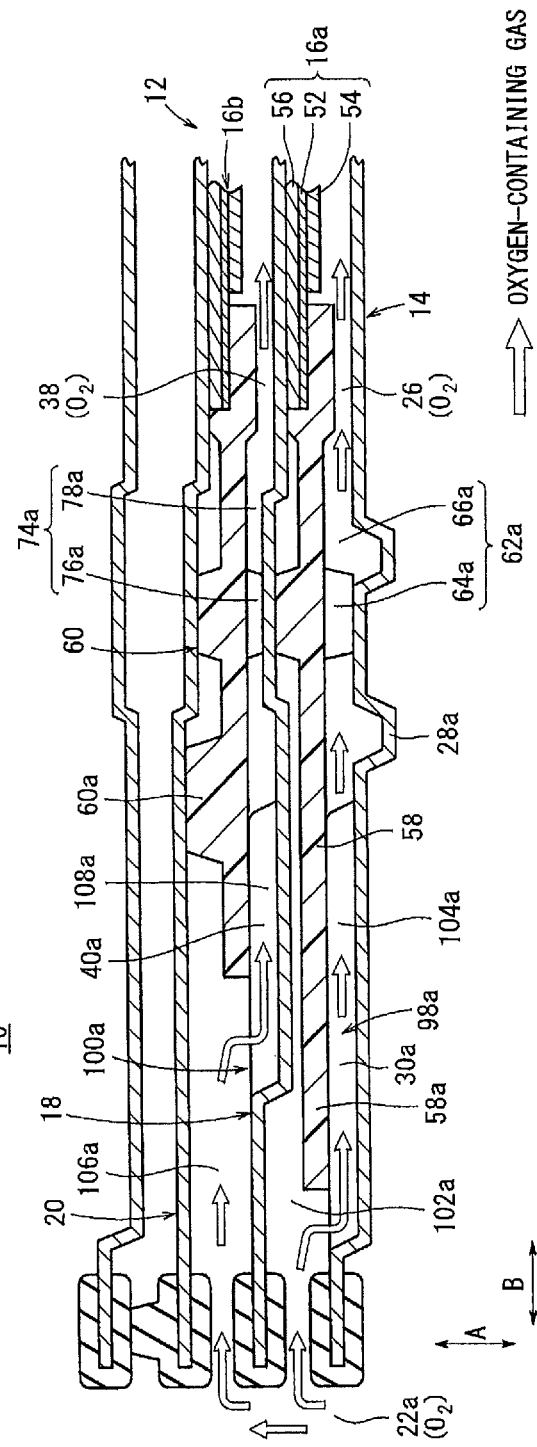
FIG. 5 is a cross sectional view showing the power generation unit taken along a line V-V in FIG. 1

As shown in FIG. 5, the oxygen-containing gas supply passage 22a and the inlet buffer 62a are connected through an inlet connection channel 98a, and the oxygen-containing gas supply passage 22a and the inlet buffer 74a are connected through an inlet connection channel 100a.

Figure 15:
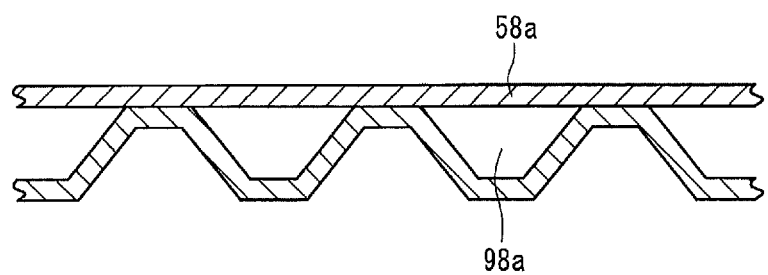
FIG. 15 is a cross sectional view showing the first metal separator taken along a line XV-XV in FIG. 6.

The inlet connection channel 98a has a corrugated shape (see FIG. 15). The inlet connection channel 98a includes a first channel 102a formed between the first metal separator 14 and the second metal separator 18, and a second channel 104a formed between the first metal separator 14 and the extension 58a of the first resin frame member 58. One end of the first channel 102a is connected to the oxygen-containing gas supply passage 22a. One end of the second channel 104a is connected to the first channel 102a, and the other end of the second channel 104a is connected to the inlet buffer 62a.

The inlet connection channel 100a includes a first channel 106a formed between the second metal separator 18 and the third metal separator 20, and a second channel 108a formed between the second metal separator 18 and the extension 60a of the second resin frame member 60. One end of the first channel 106a is connected to the oxygen-containing gas supply passage 22a. One end of the second channel 108a is connected to the first channel 106a, and the other end of the second channel 108a is connected to the inlet buffer 74a.

Likewise, outlet connection channels 98b, 100b are formed between the oxygen-containing gas discharge passage 22b and the outlet buffers 62b, 74b, and description thereof is omitted.

When the power generation units 12 are stacked together, the coolant flow field 32 is formed between the first metal separator 14 of one of the adjacent power generation units 12 and the third metal separator 20 of the other of the adjacent power generation units 12.

Operation of the fuel cell 10 will be described below.

Firstly, as shown in FIG. 1, an oxygen-containing gas is supplied to the oxygen-containing gas supply passage 22a, and a fuel gas such as a hydrogen-containing gas is supplied to the fuel gas supply passage 24a. Further, a coolant such as pure water, ethylene glycol, or oil is supplied to the coolant supply passages 25a.

Thus, as shown in FIG. 5, the oxygen-containing gas flows from the oxygen-containing gas supply passage 22a into the inlet connection channels 98a, 100a. After the oxygen-containing gas flows into the inlet connection channel 98a, the oxygen-containing gas flows through the inlet buffer 62a, and then the oxygen-containing gas is supplied to the first oxygen-containing gas flow field 26 of the first metal separator 14. Further, the oxygen-containing gas flows into the inlet connection channel 100a, the oxygen-containing gas flows through the inlet buffer 74a, and the oxygen-containing gas is supplied to the second oxygen-containing gas flow field 38 of the second metal separator 18.

As shown in FIGS. 1, 6, and 8, the oxygen-containing gas flows along the first oxygen-containing gas flow field 26 in the horizontal direction indicated by the arrow B, and the oxygen-containing gas is supplied to the cathode 54 of the first membrane electrode assembly 16a. Further, the oxygen-containing gas flows along the second oxygen-containing gas flow field 38 in the direction indicated by the arrow B, and the oxygen-containing gas is supplied to the cathode 54 of the second membrane electrode assembly 16b.

In the meanwhile, as shown in FIG. 3, the fuel gas from the fuel gas supply passage 24a flows into the inlet connection channels 86a, 88a. In the inlet connection channel 86a, the fuel gas from the first channel 90a flows through the supply holes 36a to the second channel 92a, and then the fuel gas is supplied to the inlet buffer 68a. The fuel gas flows through the inlet buffer 68a, and the fuel gas is supplied to the first fuel gas flow field 34 of the second metal separator 18.

In the inlet connection channel 88a, the fuel gas from the first channel 94a flows through the supply holes 44a to the second channel 96a, and then the fuel gas is supplied to the inlet buffer 80a. The fuel gas flows through the inlet buffer 80a, and the fuel gas is supplied to the second fuel gas flow field 42 of the third metal separator 20.

As shown in FIGS. 1, 7, and 9, the fuel gas flows along the first fuel gas flow field 34 in the direction indicated by the arrow B, and the fuel gas is supplied to the anode 56 of the first membrane electrode assembly 16a. Further, the fuel gas flows along the second fuel gas flow field 42 in the direction indicated by the arrow B, and the fuel gas is supplied to the anode 56 of the second membrane electrode assembly 16b.

Thus, in each of the first membrane electrode assembly 16a and the second membrane electrode assembly 16b, the oxygen-containing gas supplied to the cathode 54, and the fuel gas supplied to the anode 56 are consumed in electrochemical reactions at catalyst layers of the cathode 54 and the anode 56 for generating electricity.

Then, the oxygen-containing gas consumed at the cathodes 54 of the first membrane electrode assembly 16a and the second membrane electrode assembly 16b flows from the outlet buffers 62b, 74b through the outlet connection channels, and the oxygen-containing gas is discharged into the oxygen-containing gas discharge passage 22b.

As shown in FIG. 4, the fuel gas consumed at the anodes 56 of the first membrane electrode assembly 16a and the second membrane electrode assembly 16b flows from the outlet buffers 68b, 80b into the outlet connection channels 86b, 88b. In the outlet connection channel 86b, the fuel gas flows from the second channel 92b through the discharge holes 36b to the first channel 90b. Then, the fuel gas is discharged into the fuel gas discharge passage 24b.

In the outlet connection channel 88b, the fuel gas flows from the second channel 96b through the discharge holes 44b to the first channel 94b. Then, the fuel gas is discharged into the fuel gas discharge passage 24b.

In the meanwhile, as shown in FIG. 1, the coolant supplied to the pair of coolant supply passages 25a flows into the coolant flow field 32. The coolant from each of the coolant supply passages 25a is supplied to the coolant flow field 32. The coolant temporarily flows inward in the direction indicated by the arrow C, and then the coolant moves in the direction indicated by the arrow B to cool the first membrane electrode assembly 16a and the second membrane electrode assembly 16b. After the coolant moves outward in the direction indicated by the arrow C, the coolant is discharged into the pair of coolant discharge passages 25b.

In the first embodiment, for example, as shown in FIGS. 5 and 11, in the first membrane electrode assembly 16a, the first resin frame member 58 is provided at the outer circumferential portion of the solid polymer electrolyte membrane 52. The strength and the rigidity of the first resin frame member 58 are considerably high in comparison with the solid polymer electrolyte membrane 52 and the gas diffusion layer made of the carbon paper.

Further, as shown in FIG. 11, the inlet buffer 62a, the outlet buffer 62b, and the extensions 58a, 58b as parts of the inlet connection channel 98a and the outlet connection channel 98b are provided on the surface of the first resin frame member 58 on a side where the cathode 54 is provided. In the structure, as shown in FIG. 5, when the extension 58a of the first resin frame member 58 contacts the surface between the inlet connection grooves 30a of the first metal separator 14 to form the bridge section, the rigid and thick extension 58a of the first resin frame member 58 is not deformed to enter the inlet connection grooves 30a.

Accordingly, with the simple and economical structure, it is possible to reliably prevent the inlet connection grooves 30a from being closed, while achieving a desired sealing performance.

Further, since the inlet buffer 62a can be formed in the first resin frame member 58, the structure of the first metal separator 14 is simplified effectively and economically.

Also in the outlet buffer 62b and the extension 58b, the same advantages as described above are obtained. Further, also in the second resin frame member 60, the same advantages as in the case of the first resin frame member 58 are obtained.

Figure 16:
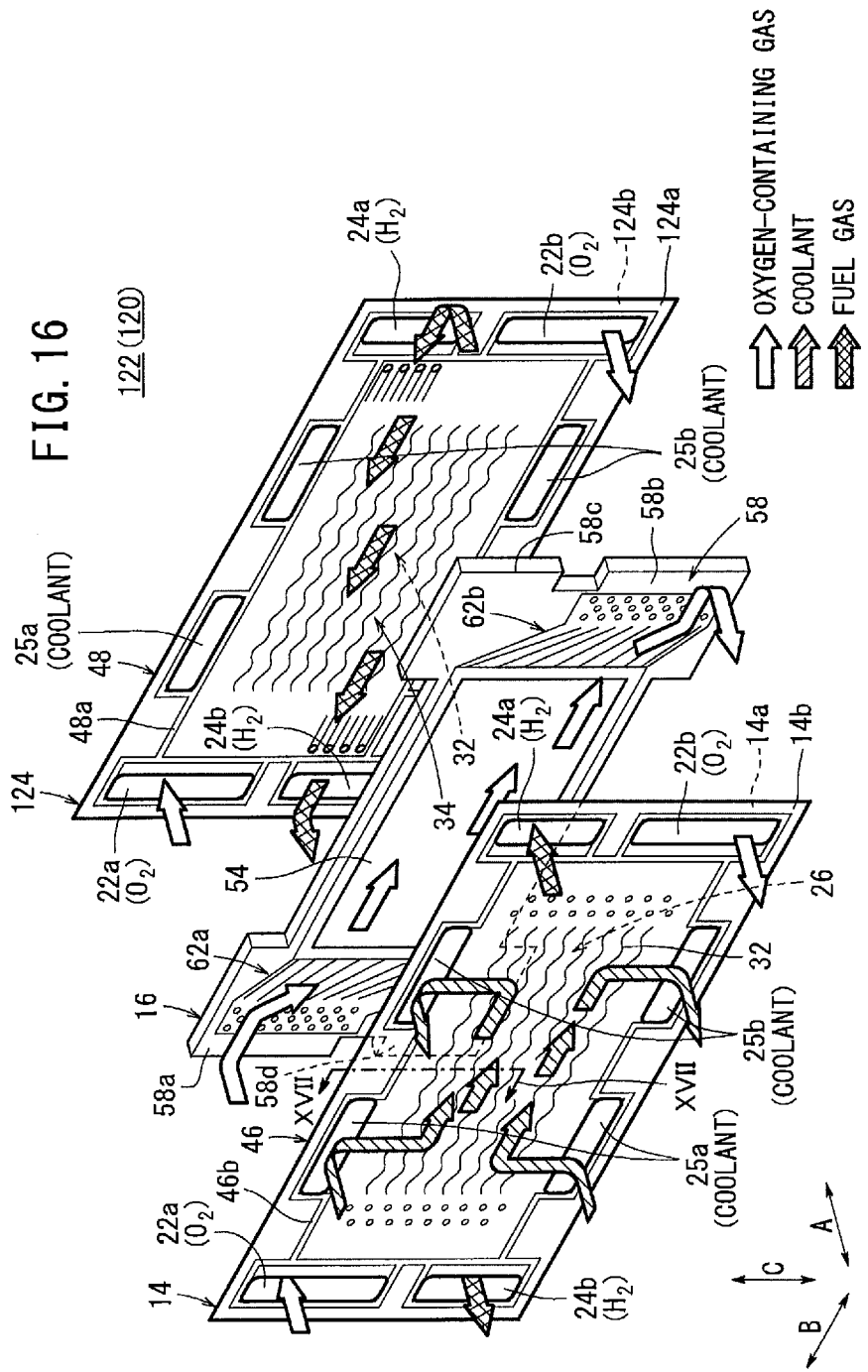
FIG. 16 is an exploded perspective view showing main components of a power generation unit of a fuel cell according to a second embodiment of the present invention.

As shown in FIGS. 16 and 17, a fuel cell 120 according to a second embodiment of the present invention is formed by stacking a plurality of power generation units 122.

The power generation unit 122 is formed by sandwiching a membrane electrode assembly 16 between a first metal separator 14 and a second metal separator 124. The constituent elements that are identical to those of the fuel cell 10 according to the first embodiment are labeled with the same reference numerals, and description thereof will be omitted.

The second metal separator 124 has a fuel gas flow field 34 on its surface 124a facing the membrane electrode assembly 16. Part of a coolant flow field 32 is formed on the other surface 124b of the second metal separator 124. The membrane electrode assembly 16 has the same structure as the first membrane electrode assembly 16a or the second membrane electrode assembly 16b according to the first embodiment.

In the second embodiment, the first resin frame member 58 is provided for the membrane electrode assembly 16, and the same advantages as in the case of the first embodiment are obtained.

The invention claimed is:

1. A fuel cell formed by stacking a membrane electrode assembly and metal separators in a stacking direction, the membrane electrode assembly including a pair of electrodes, and an electrolyte interposed between the electrodes, the metal separators each having a reactant gas flow field for supplying a reactant gas along an electrode surface and a reactant gas passage for allowing the reactant gas to flow in the stacking direction, a resin frame member being provided at an outer circumferential portion of the membrane electrode assembly, wherein an outer shape of the resin frame member is configured such that the resin frame member is positioned inward relative to the reactant gas passage provided at an outer circumference of each of the metal separators and wherein a portion of the resin frame member extends outwardly beyond an outer circumferential end of the electrolyte, and wherein the resin frame member includes:

a buffer positioned outside a power generation area and connected to the reactant gas flow field;

a part of a connection channel connecting the buffer and the reactant gas passage; and the buffer includes at least one of bosses and linear ridges, and wherein the buffer and the part of the connection channel are positioned outside of the outer circumferential end of the electrolyte.

2. The fuel cell according to claim 1, wherein the connection channel includes:

a first channel formed between the metal separators that are adjacent to each other;

a hole extending through one of the metal separators in the stacking direction; and a second channel formed between the metal separator and the resin frame member that are adjacent to each other, and wherein one end of the first channel is connected to the reactant gas passage, another end of the first channel is connected to the hole, one end of the second channel is connected to the hole and another end of the second channel is connected to the buffer.

3. The fuel cell according to claim 1, wherein the connection channel includes:

a first channel formed between the metal separators that are adjacent to each other; and a second channel formed between the metal separator and the resin frame member that are adjacent to each other, and wherein one end of the first channel is connected to the reactant gas passage, one end of the second channel is connected to the first channel, and another end of the second channel is connected to the buffer.

4. The fuel cell according to claim 1, wherein a first buffer is provided on one surface of the resin frame member, and a second buffer is provided on another surface of the resin frame member; and each of the first buffer and the second buffer includes guide grooves.

* * * * *